Nov. 28, 1933.    P. L. BILLINGSLEY    1,937,261
SAW SETTING DEVICE
Filed May 21, 1930    2 Sheets-Sheet 2

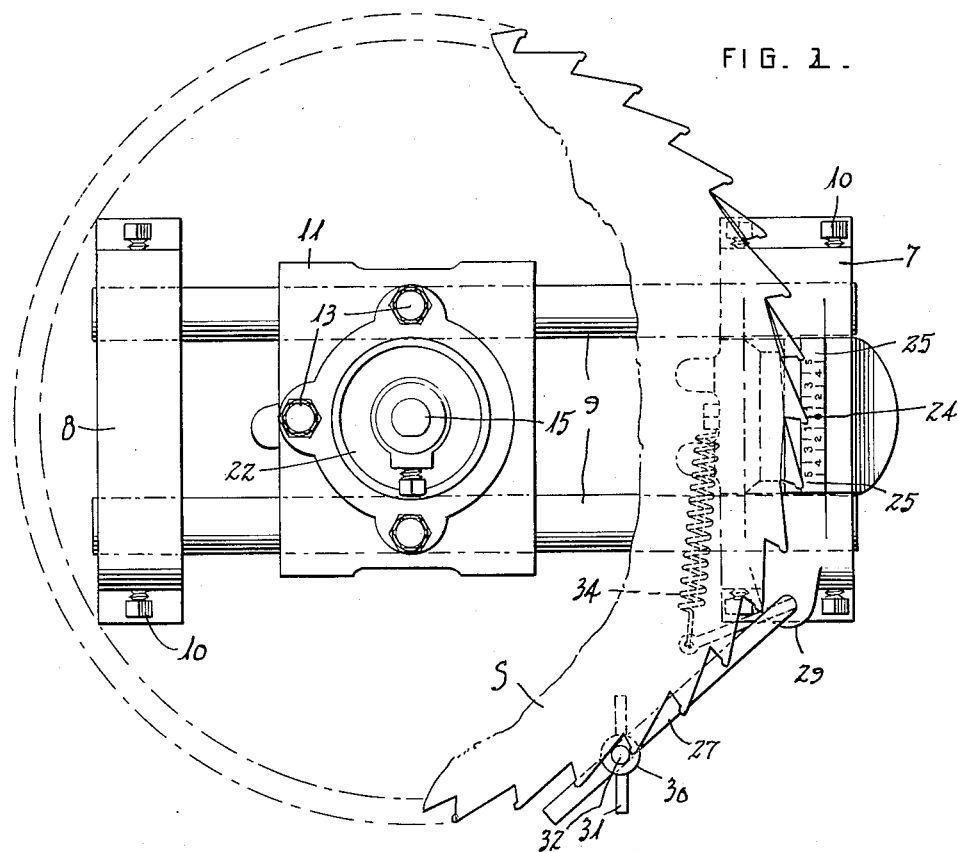
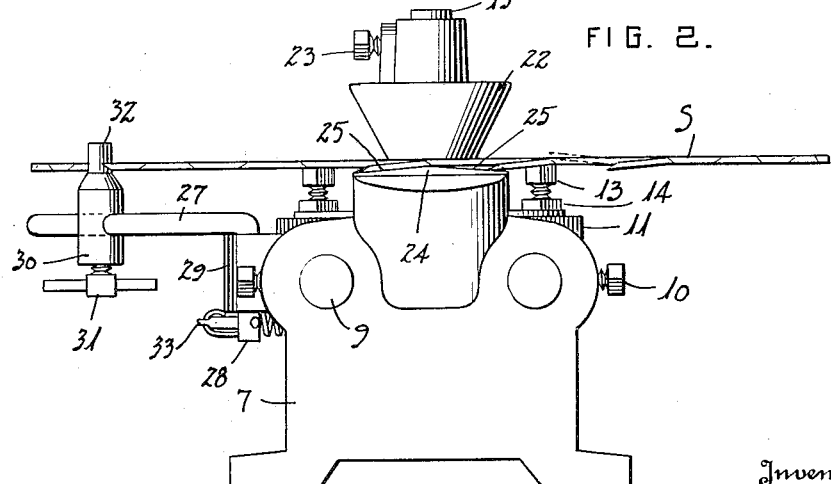

Inventor:
P. L. Billingsley
By Monroe Miller
Attorney.

Patented Nov. 28, 1933

1,937,261

UNITED STATES PATENT OFFICE 1,937,261

SAW SETTING DEVICE

Percy L. Billingsley, Orlando, Fla.

Application May 21, 1930. Serial No. 454,488

2 Claims. (Cl. 76—73)

The present invention relates to saw setting devices, and aims to provide a novel and improved device of that kind adapted especially for setting the teeth of circular saws, such as disclosed in my Patent No. 1,666,987 granted April 24, 1928.

Another object of the invention is the provision of a saw setting device having novel means for supporting the saw and adjustable for saws of different diameters.

A further object is the provision of such a device having a novel anvil for setting the saw teeth.

A further object is the provision of means for conveniently positioning the saw teeth on the anvil.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the improved saw setting device, a portion of the saw being shown in full lines.

Fig. 2 is a front view of the device.

Figure 3:
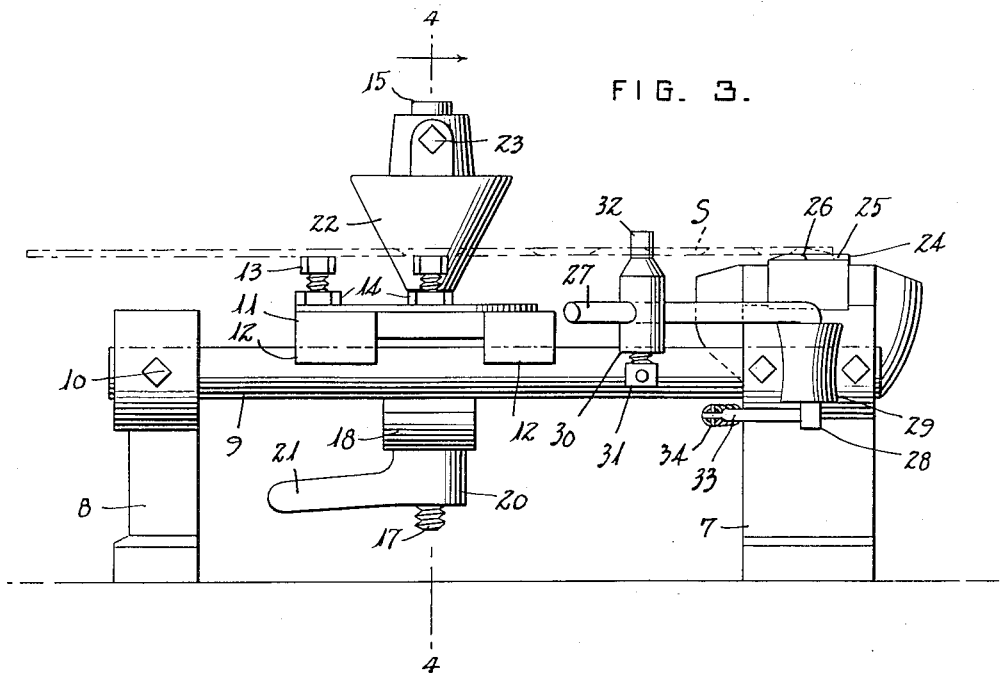
Fig. 3 is a side elevation thereof.
Figure 4:
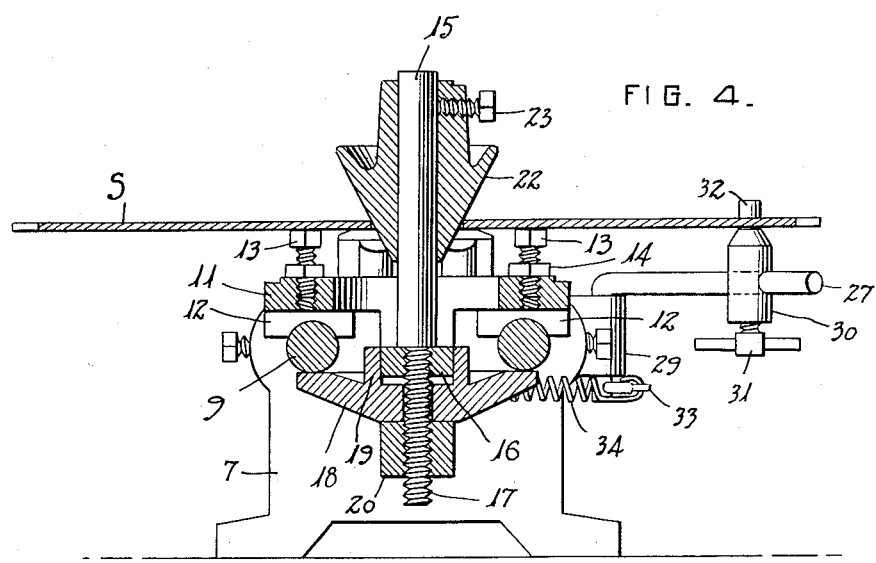
Fig. 4 is a cross-section on the line 4—4 of Fig. 3.

The base of the device comprises the end members 7 and 8 in which are fitted the terminals of a pair of parallel rods 9, said members having set screws 10 for clamping the rods therein.

A slide 11 is adjustable longitudinally on the base, being provided with grooved lugs 12 fitting slidably on the rods 9. Screws 13 are threaded within said slide and extend upwardly therefrom to provide a seat for the saw S. Said screws are adjustable vertically in order to support the saw in the desired horizontal plane with reference to the anvil. Lock nuts 14 are provided on said screws to maintain the adjustment thereof.

A vertical spindle 15 is mounted on the slide 11, and said slide has a downwardly offset portion 16 through which the lower terminal 17 of the spindle is screw-threaded.

In order to clamp the slide 11 in position on the rods 9, a clamping member 18 is fitted on the terminal 17 of the spindle, and has upstanding flanges 18 overlapping the portion 16 to prevent said member from turning. The terminals of the member 18 contact with the lower surfaces of the rods 9, and a nut 20 is threaded on the terminals 17 and when tightened will clamp the rods 9 between the lugs 12 and member 18. Said nut 20 has a handle 21 for conveniently turning it. When the nut 20 is loosened the slide 11 may be adjusted longitudinally on the base to position the spindle 15 according to the diameter of the saw.

A saw-centering cone 22 is slidable on the spindle 15, so as to enter the central aperture of the saw after the saw has been placed over the spindle and seated on the screws 13, thereby bringing the saw concentric with the spindle 15 around which the saw is turned when setting the teeth. The cone 22 carries a set screw 23 for clamping it on the spindle.

Figure 5:
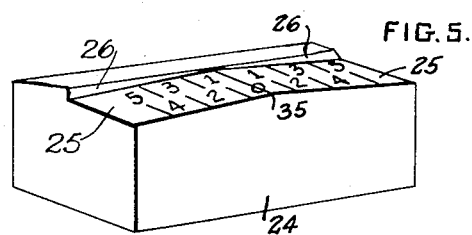
Fig. 5 is an enlarged perspective view of the anvil.

The end member 7 of the base has an anvil 24 secured thereon, which anvil has the surfaces 25 sloping in opposite directions, and the anvil has shoulders 26 in rear of the surfaces 25 to define the offsets of the saw teeth, such as disclosed in Patent No. 1,666,987, while the surfaces 25 define the angles of the teeth with reference to the plane of the saw. Alternate teeth are hammered down or set on one of the surfaces 25, and then by inverting the saw the other teeth may be set on the other surface 25, so that the teeth are set toward opposite sides as disclosed in said patent. The height of the ridge 35 of the anvil is even with the top surface of the shoulder 26, as shown in Figs. 1 and 5.

In order to conveniently position the teeth on the anvil, an arm 27 has a downturned portion 28 mounted for rotation in a lug 29 formed on the end member 7, so that said arm may be swung toward and away from the saw teeth. A member 30 is slidable on the arm 27 and is secured in its adjusted position by a set screw 31. Said member 30 has an upstanding finger 32 to engage between two of the saw teeth, as seen in Fig. 1, so as to position another tooth properly on the anvil 24 to be set on the corresponding surface 25 and against the shoulder 26. Then, by swinging the arm 27 outwardly, the saw is released so that it may be turned to bring another tooth into position over the anvil.

The portion 28 has an arm 33 connected by a coiled spring 34 with the member 7, so that the arm 27 is yieldingly swung inwardly to move the finger 32 between the saw teeth. The anvil surfaces 25 are graduated, as seen in Fig. 1 and Fig. 5, from the ridge between said surfaces, to facilitate the proper positioning of the saw teeth on the anvil, and by adjusting the member 30 on the arm 27, the other teeth of the saw which are to be set similarly may be conveniently brought into position on the anvil without further adjustment.

Having thus described the invention, what is claimed as new is:—

1. A saw setting device having a frame, a centering saw support mounted on the frame, an anvil secured to the frame and having surfaces sloping away from one another, said anvil having a horizontal ridge between said surfaces in coincidence with a radial line passing through said saw support, and a shoulder defining a horizontal supporting surface even with said ridge disposed at the back of said surfaces for supporting the peripheral edge of the saw radially inwardly of the teeth thereof.

2. A saw setting device having a frame, a centering saw support mounted on the frame, an anvil secured to the frame and having surfaces sloping downwardly away from one another to form a dihedral angle between said surfaces, the apex of which is in a horizontal line and is in coincidence with a radial line passing through said saw support, and a shoulder defining a horizontal supporting surface at the back of said surfaces for supporting the peripheral edge of the saw inwardly of the teeth thereof.

PERCY L. BILLINGSLEY.